US011609663B2

(12) United States Patent
Chen

(10) Patent No.: US 11,609,663 B2
(45) Date of Patent: Mar. 21, 2023

(54) SELF-CAPACITIVE TOUCH DISPLAY PANEL

(71) Applicant: Wuhan China Star Optoelectronics Semiconductor Display Technology Co., Ltd., Wuhan (CN)

(72) Inventor: Bi Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 213 days.

(21) Appl. No.: 16/769,253

(22) PCT Filed: Mar. 2, 2020

(86) PCT No.: PCT/CN2020/077392
§ 371 (c)(1),
(2) Date: Jun. 3, 2020

(87) PCT Pub. No.: WO2021/128581
PCT Pub. Date: Jul. 1, 2021

(65) Prior Publication Data
US 2021/0405784 A1     Dec. 30, 2021

(30) Foreign Application Priority Data
Dec. 26, 2019   (CN) .......................... 201911369367.X

(51) Int. Cl.
*G06F 3/041*     (2006.01)
*G06F 3/044*     (2006.01)

(52) U.S. Cl.
CPC ............ *G06F 3/044* (2013.01); *G06F 3/0412* (2013.01); *G06F 2203/04107* (2013.01)

(58) Field of Classification Search
CPC ........ G06F 3/041; G06F 3/0412; G06F 3/044; G06F 3/0443; G06F 2203/04107; G02F 1/13338; H01L 27/323
See application file for complete search history.

(56) References Cited

U.S. PATENT DOCUMENTS

| 2016/0103534 | A1* | 4/2016 | Zhang | G06F 3/0412 |
| | | | | 345/173 |
| 2016/0291756 | A1* | 10/2016 | Li | G06F 3/0412 |
| 2018/0203555 | A1* | 7/2018 | Miyamoto | G06F 3/04164 |
| 2018/0299984 | A1* | 10/2018 | Zang | G06F 3/044 |
| 2020/0026384 | A1* | 1/2020 | Rhe | G06F 3/0443 |
| 2020/0333916 | A1* | 10/2020 | Zhang | G06F 3/0443 |

FOREIGN PATENT DOCUMENTS

| CN | 104793828 | 7/2015 |
| CN | 106873820 | 6/2017 |
| CN | 206312114 | 7/2017 |
| CN | 107092393 | 8/2017 |
| CN | 110058736 | 7/2019 |

* cited by examiner

*Primary Examiner* — Ryan A Lubit

(57) ABSTRACT

A self-capacitive touch display panel is provided, including a display panel and a touch layer disposed on the display panel. The touch layer includes a touch lead layer including a plurality of touch leads, a first insulating layer, a touch shielding layer, a second insulating layer, and a touch sensing layer including sensing patterns arranged in an array, disposed in order on the display panel, wherein the sensing patterns of the touch sensing layer are configured to communicate with the touch leads through the touch shielding layer.

16 Claims, 3 Drawing Sheets

SELF-CAPACITIVE TOUCH DISPLAY PANEL

RELATED APPLICATIONS

This application is a National Phase of PCT Patent Application No. PCT/CN2020/077392 having International filing date of Mar. 2, 2020, which claims the benefit of priority of Chinese Patent Application No. 201911369367.X filed on Dec. 26, 2019. The contents of the above applications are all incorporated by reference as if fully set forth herein in their entirety.

FIELD AND BACKGROUND OF THE INVENTION

The invention relates to the field of display technology, and in particular, to a self-capacitive touch display panel.

With advancement of society, mobile phones have become important electronic products that affect people's lives and work. Touch displays of mobile phones are an indispensable part of human-computer interaction. Flexible touch displays have gradually become a future mainstream development direction. In the flexible touch displays, a touch display panel needs to be made thinner to achieve a smaller bending radius.

In the prior art, flexible display touch usually adopts an active-matrix organic light-emitting diode (AMOLED) panel, and a mutual-capacitive touch solution is used in the AMOLED panel. In a flexible and foldable touch display solution, a thin cover design is usually used, and material of the cover is selected from transparent polyimide (PI) or flexible glass, or a combination thereof. A thickness of the cover is between 50 µm and 200 µm. The thin cover design in the mutual-capacitive touch solution causes a multi-point floating problem, which leads to unsatisfactory touch experience for users. Adopting a self-capacitive design in an AMOLED on-cell touch solution can effectively solve the problem of multi-point floating touch, but there are problems in the self-capacitive touch design. As shown in FIG. 1, in the self-capacitive touch design, an excessive number of leads in a near-end touch pattern near an end of a flexible printed circuit (FPC) causes a touch dead zone.

Therefore, it is urgent to seek a self-capacitive touch display panel to solve the technical problem of poor near-end touch performance in the prior art.

Technical Problem

An embodiment of the present invention provides a self-capacitive touch display panel. By adding a touch shielding layer between a touch sensing layer and a touch lead layer, self-capacitive touch patterns on a near-end and a far-end of the touch panel are a same size, ensuring consistent touch performance on the near-end and the far-end, and improving touch performance of a flexible touch display panel.

SUMMARY OF THE INVENTION

In a first aspect, an embodiment of the present application provides a self-capacitive touch display panel, wherein the self-capacitive touch display panel includes a display panel and a touch layer disposed on the display panel. The touch layer includes a touch lead layer disposed on the display panel and including a plurality of touch leads, a first insulating layer disposed on the touch lead layer, a touch shielding layer disposed on the first insulating layer, a second insulating layer disposed on the touch shielding layer, and a touch sensing layer disposed on the second insulating layer and comprising sensing patterns arranged in an array.

Wherein the sensing patterns of the touch sensing layer are configured to communicate with the touch leads of the touch lead layer through the touch shielding layer.

Wherein the touch shielding layer includes a first touch shielding layer and a second touch shielding layer, and the second touch shielding layer is disposed between the first insulating layer and the second insulating layer.

Wherein the display panel includes a light-emitting area and a non-light-emitting area, and the non-light-emitting area includes a bending area, a wire changeover area, and a bonding area.

The touch leads of the touch lead layer are connected to the wire changeover area when the bending area is bent.

The wire changeover area is disposed on one side of the bending area away from the touch lead layer, and the touch leads of the touch lead layer are changed from the bending area to the bonding area in the wire changeover area, and the bonding area is disposed on one side of the wire changeover area away from the bending area.

In some embodiments, a first via-hole is disposed on the first insulating layer, a second via-hole is disposed on the second insulating layer, and the first touch shielding layer is disposed between the first via-hole and the second via-hole, and the sensing patterns of the touch sensing layer are configured to communicate with the touch leads of the touch lead layer through the first touch shielding layer.

In some embodiments, the first via-hole and the second via-hole are coaxial, and an opening width of the first via-hole is less than an opening width of the second via-hole.

In some embodiments, the bonding area includes a touch bonding area and a display bonding area. The touch bonding area includes a plurality of touch bonding terminals, and the display bonding area includes a plurality of display bonding terminals. The touch lead of the touch lead layer is connected to the touch terminal, and the display bonding terminal is connected to a display driver disposed on the display panel.

In some embodiments, the wire changeover area includes a first wire changeover area and a second wire changeover area, and the first wire changeover area and the second wire changeover area each includes at least two multiplexer (MUX) circuits connected in series.

In some embodiments, the MUX circuit is one of a positive channel metal oxide semiconductor (PMOS) structure, a negative channel metal oxide semiconductor (NMOS) structure, and a complementary metal oxide semiconductor (CMOS) structure.

In some embodiments, the material of the first insulating layer and the second insulating layer is one of silicon nitride, silicon oxide, or a combination thereof.

In some embodiments, the material of the touch lead layer, the touch shielding layer, and the touch sensing layer is indium tin oxide, or a combination of indium tin oxide and silver, or a combination of indium tin oxide and aluminum.

In a second aspect, an embodiment of the present application further provides a self-capacitive touch display panel, wherein the self-capacitive touch display panel includes a display panel and a touch layer disposed on the display panel.

The touch layer includes a touch lead layer disposed on the display panel and including a plurality of touch leads, a first insulating layer disposed on the touch lead layer, a touch shielding layer disposed on the first insulating layer, a second insulating layer disposed on the touch shielding layer, and a touch sensing layer disposed on the second insulating layer and including sensing patterns arranged in an array.

Wherein the sensing patterns of the touch sensing layer are configured to communicate with the touch leads of the touch lead layer through the touch shielding layer.

In some embodiments, the touch shielding layer includes a first touch shielding layer and a second touch shielding layer, and the second touch shielding layer is disposed between the first insulating layer and the second insulating layer.

In some embodiments, a first via-hole is disposed on the first insulating layer, a second via-hole is disposed on the second insulating layer, and the first touch shielding layer is disposed between the first via-hole and the second via-hole, and the sensing patterns of the touch sensing layer are configured to communicate with the touch leads of the touch lead layer through the first touch shielding layer.

In some embodiments, the first via-hole and the second via-hole are coaxial, and an opening width of the first via-hole is less than an opening width of the second via-hole.

In some embodiments, the display panel includes a light-emitting area and a non-light-emitting area, and the non-light-emitting area includes a bending area, a wire changeover area, and a bonding area. The touch leads of the touch lead layer are connected to the wire changeover area when the bending area is bent. The wire changeover area is disposed on one side of the bending area away from the touch lead layer, the touch leads of the touch lead layer are changed from the bending area to the bonding area in the wire changeover area, and the bonding area is disposed on one side of the wire changeover area away from the bending area.

In some embodiments, the bonding area includes a touch bonding area and a display bonding area. The touch bonding area includes a plurality of touch bonding terminals, and the display bonding area includes a plurality of display bonding terminals, the touch lead of the touch lead layer is connected to the touch terminal, and the display bonding terminal is connected to a display driver disposed on the display panel.

In some embodiments, the wire changeover area includes a first wire changeover area and a second wire changeover area, and the first wire changeover area and the second wire changeover area each includes at least two MUX circuits connected in series.

In some embodiments, the MUX circuit is one of a PMOS structure, an NMOS structure, and a CMOS structure.

In some embodiments, the material of the first insulating layer and the second insulating layer is one of silicon nitride, silicon oxide, or a combination thereof.

In some embodiments, the material of the touch lead layer, the touch shielding layer, and the touch sensing layer is indium tin oxide or a combination of indium tin oxide and silver or a combination of indium tin oxide and aluminum.

In some embodiments, the self-capacitive touch display panel further includes an encapsulation layer disposed above the display panel and below the touch layer.

In some embodiments, the self-capacitive touch display panel further includes a touch protection insulating layer disposed above the touch layer, a polarizer disposed above the touch protection insulating layer, and a protective cover disposed above the polarizer.

Beneficial Effect

Compared with the prior art, in an embodiment of the present invention, by adding a touch shielding layer between a touch sensing layer and a touch lead layer, self-capacitive touch patterns at a near-end and a far-end of a touch panel are a same size. This ensures consistent touch performance at the near-end and the far-end, and improves touch performance of a flexible touch display panel. In addition, by adding a wire changeover area on the display panel, touch leads of the touch lead layer are changed in the wire changeover area. In a case where a number of sensing patterns of the touch sensing layer is unchanged, a number of touch leads leading to a touch bonding terminal is reduced, so that a position for a display bonding area is reserved for convenient implementation of an on-cell panel. In this way, the display bonding area is separated from a touch bonding area, so that the touch leads and display leads are not excessively concentrated, thereby preventing signal interference.

DESCRIPTION OF SPECIFIC EMBODIMENTS OF THE INVENTION

Figure 1:
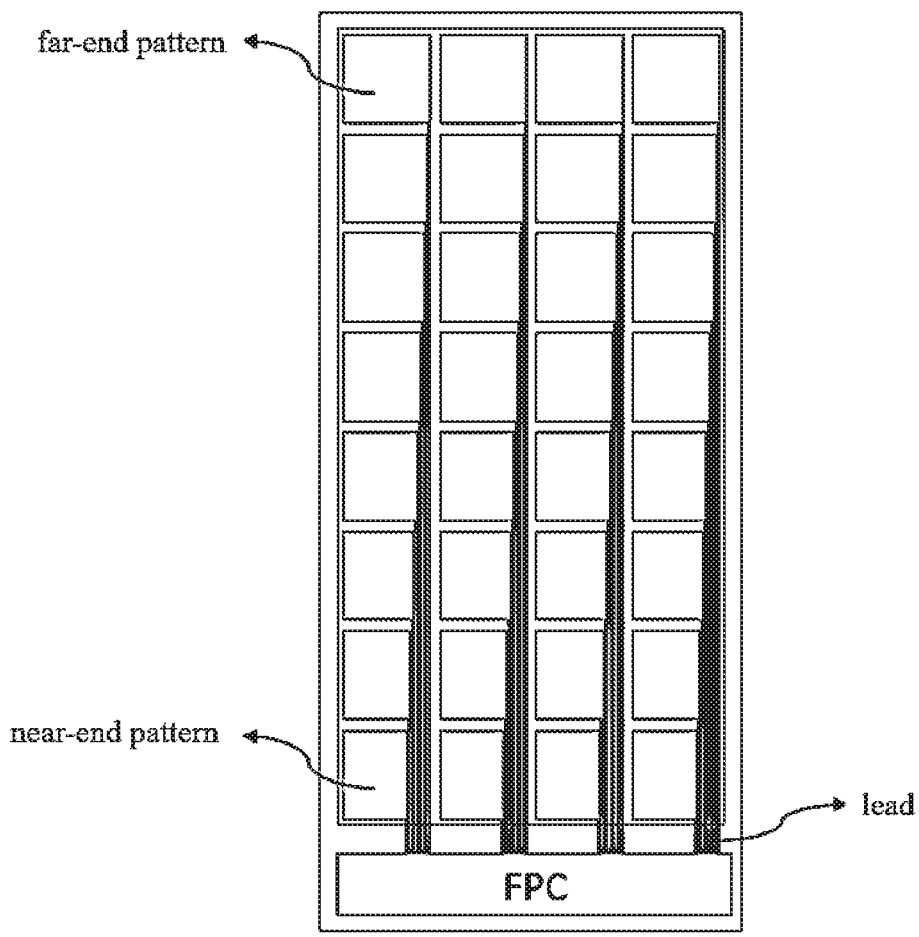
FIG. 1 is a diagram of a self-capacitive touch design solution of a flexible touch display panel in the prior art.

The technical solutions in the embodiments of the present invention will be clearly and completely described below with reference to the accompanying drawings in the embodiments of the present invention. Obviously, the embodiments are only a part of the embodiments of the present invention, but not all the embodiments. Based on the embodiments of the present invention, all other embodiments obtained by those skilled in the art without creative work fall into the protection scope of the present invention.

In the description of the present invention, it should be understood that the orientations or positional relationships indicated by the terms "center", "longitudinal", "transverse", "length", "width", "thickness", "upper", "lower", "front", "back", "left", "right", "vertical", "horizontal", "top", "bottom", "inside", "outside", etc. are based on the orientations or positional relationships shown in the drawings, and are only for the convenience of describing the present invention and simplifying the description, rather than indicating or implying that the device or element referred to must have a particular orientation, be constructed and operate in a particular orientation. It should not be construed as limiting the invention. In addition, the terms "first" and "second" are used for descriptive purposes only, and cannot be understood as indicating or implying relative importance or implicitly indicating the number of technical features. Therefore, the features defined as "first" and "second" may explicitly or implicitly include one or more of the features. In the description of the present invention, the meaning of "plurality" is two or more, unless specifically defined otherwise.

In the present application, the term "exemplary" is used to mean "serving as an example, illustration, or illustration." Any embodiment described as "exemplary" in the present application is not necessarily to be construed as preferred or advantageous over other embodiments. In order to enable any person skilled in the art to implement and use the present invention, the following description is given. In the following description, details are set forth for the purpose of explanation. It should be understood by those of ordinary skill in the art that the present invention may be implemented without the use of these specific details. In other embodiments, well-known structures and procedures will not be described in detail to avoid obscuring the description of the present invention with unnecessary details. Accordingly, the invention is not intended to be limited to the embodiments but is to be accorded the widest scope consistent with the principles and features disclosed herein.

An embodiment of the present invention provides a self-capacitive touch display panel, which will be described in detail below.

Figure 2:
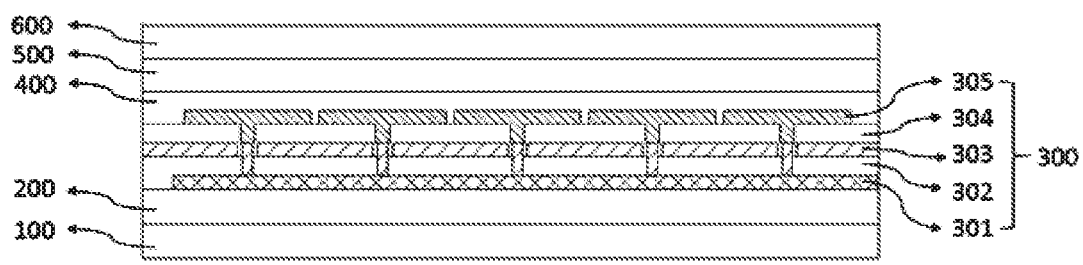
FIG. 2 is a schematic structural diagram of a self-capacitive touch display panel according to an embodiment of the present invention.

Shown in FIG. 2 is a schematic structural diagram of a self-capacitive touch display panel in the present invention. The self-capacitive touch display panel includes a display panel 100, an encapsulation layer 200, a touch layer 300, a touch protection insulating layer 400, a polarizer 500, and a protective cover 600, which are sequentially stacked from bottom to top. The display panel 100 can be an active-matrix organic light-emitting diode (AMOLED). That is, the active-matrix organic light-emitting diode is a flexible panel. The encapsulation layer 200 is used to encapsulate the display panel 100 to protect the display panel 100 and prevent water vapor and oxygen from eroding the display panel 100. The touch protection insulating layer 400 is used to protect the touch layer 300. The polarizer 500 is used to convert natural light into polarized light. The cover 600 is a flexible cover, which is used to protect the polarizer 500 and all structures below. A material of the cover 600 can be transparent polyimide (PI) or flexible glass, or a combination thereof.

The touch layer 300 includes a touch lead layer 301 disposed on the encapsulation layer 200 and including a plurality of touch leads, a first insulating layer 302 disposed on the touch lead layer 301, a touch shielding layer 303 disposed on the first insulating layer 302, a second insulating layer 304 disposed on the touch shielding layer 303, and a touch sensing layer 305 disposed on the second insulating layer 304 and including sensing patterns arranged in an array. A material of the first insulating layer 302 and the second insulating layer 304 is one of silicon nitride or silicon oxide, or a combination thereof, which improves water and oxygen blocking performance and safety factor of use. Materials of the touch lead layer 301, the touch shielding layer 303, and the touch sensing layer 305 are indium tin oxide, a combination of indium tin oxide and silver, or a combination of indium tin oxide and aluminum.

The sensing patterns of the touch sensing layer 305 communicate with the touch leads of the touch lead layer 301 through the touch shielding layer 303.

Figure 3:
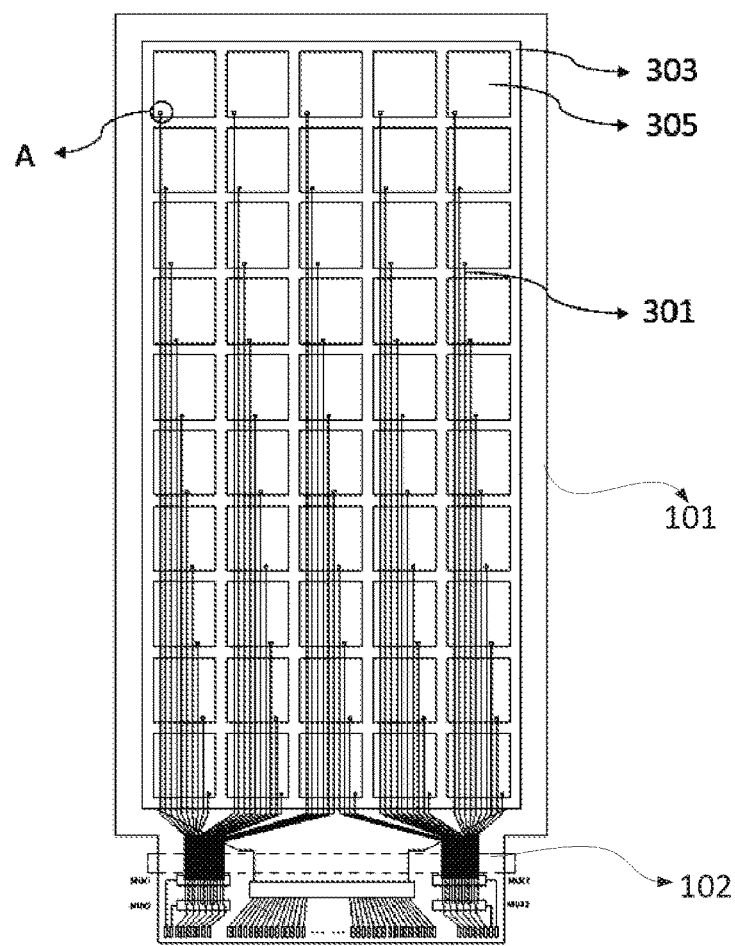
FIG. 3 is a schematic diagram of a touch lead of a self-capacitive touch display panel according to an embodiment of the present invention.

Further, as shown in FIG. 3, the display panel 100 includes a light-emitting area 101 and a non-light emitting area 102. The touch sensing layer 305 forms several sensing patterns of self-capacitive touch sensing, and the sensing patterns are distributed in an array. Each sensing pattern communicates with the touch leads of the corresponding touch lead layer 301 below through a via-hole area A provided in the lower right corner thereof. The touch sensing layer 305 communicates with the touch lead layer 301 through the touch shielding layer 303, so that the sensing patterns can be arranged in the light-emitting area 101 of the display panel 100 at equal sizes and equal distances. Therefore, a near-end of the touch panel does not have a blind zone existing in the conventional self-capacitive touch solution, and touch effects of the near-end and a far-end are consistent.

It should be noted that in order to reduce a length of the touch leads, the via-hole area A is generally disposed below each sensing pattern, and can also be disposed at a lower-left or a lower-right corner. It is not limited herein.

Figure 4:
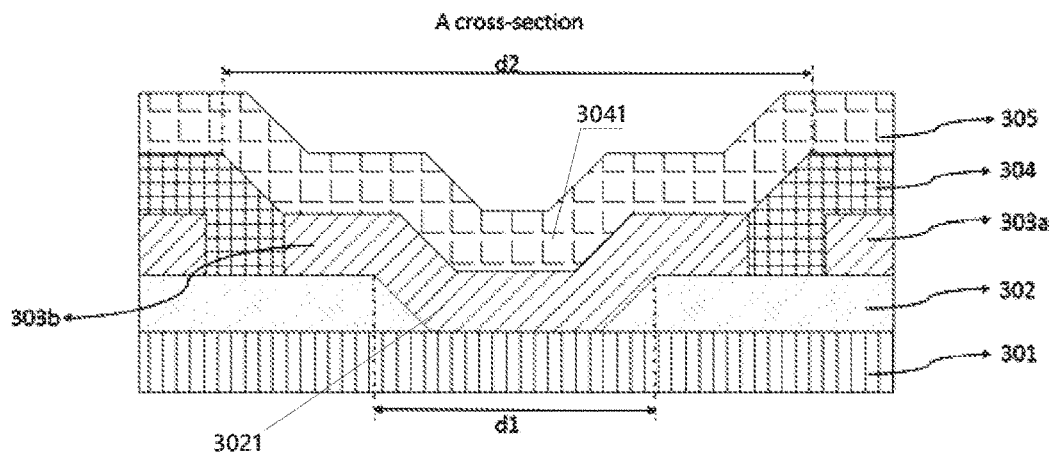
FIG. 4 is a schematic structural diagram of a self-capacitive touch display panel at a via-hole position provided by an embodiment of the present invention.

Specifically, as shown in FIG. 4, the touch shielding layer 303 includes a first touch shielding layer 303b and a second touch shielding layer 303a. The second touch shielding layer 303a is disposed between the first insulation layer 302 and the second insulation layer 304, and the second touch shielding layer 303a is grounded to shield signal interference of the touch leads to the touch sensing layer 305 and improve touch performance.

A specific structure of the via-hole area A is as follows: a first via-hole 3021 is defined on the first insulating layer 302, a second via-hole 3041 is defined on the second insulating layer 304, and a first touch shielding layer 303b is disposed between the first via-hole 3021 and the second via-hole 3041. The sensing pattern of the touch sensing layer 305 communicates with the touch leads of the touch lead layer 301 through the first touch shielding layer 303b.

Further, as shown in FIG. 4, the first via-hole 3021 and the second via-hole 3041 are coaxial, and an opening width d1 of the first via-hole 3041 is less than an opening width d2 of the second via-hole 3042.

Figure 5:
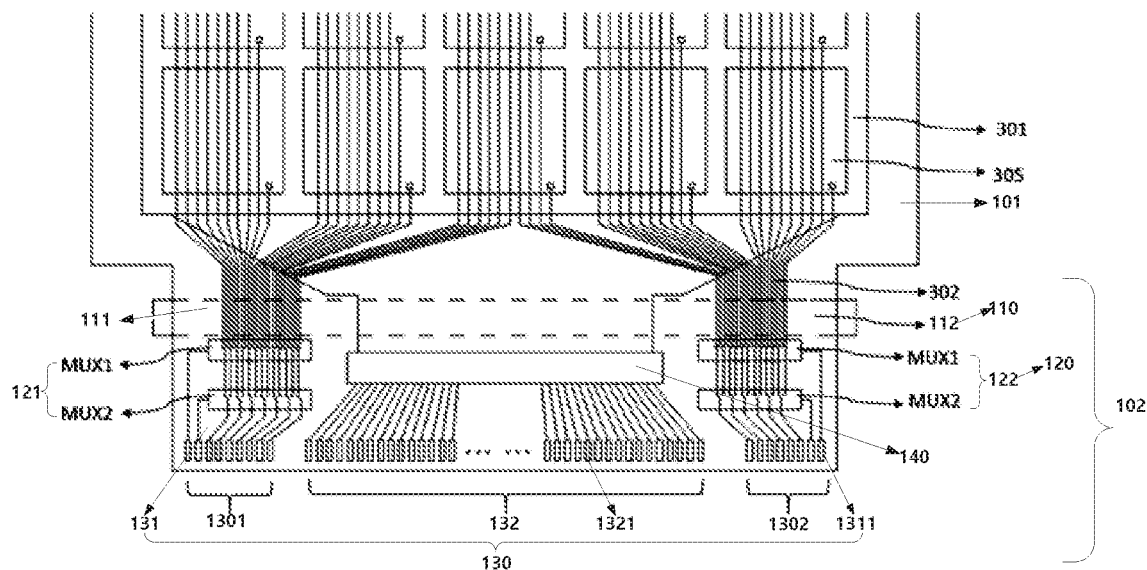
FIG. 5 is a schematic structural diagram of a display panel of a self-capacitive touch display panel according to an embodiment of the present invention.

Further, as shown in FIG. 5, the non-light emitting area 102 includes a bending area 110, a wire changeover area 120, and a bonding area 130.

The touch leads of the touch lead layer 301 are connected to the wire changeover area 120 after being bent in the bending area 110. The wire changeover area 120 is disposed on one side of the bending area 110 away from the touch lead layer 301. The touch leads of the touch lead layer 301 are changed from the bending area 110 to the bonding area 130 in the wire changeover area 120. The bonding area 130 is disposed on one side of the wire changeover area 120 away from the bending area 110.

In some embodiments of the present application, two bending areas are provided, which are a first bending area 111 and a second bending area 112, respectively. The first bending area 111 and the second bending area 112 are disposed on both sides of the non-light emitting area 102. The touch leads of the touch lead layer 301 are divided into two groups respectively connected to the first bending area 111 and the second bending area 112, leaving a space in the middle of the display panel 100. This can prevent signal interference between the display area and the touch area of the display panel 100 to ensure the touch performance.

Further, the present application is provided with two wire changeover areas, namely a first wire changeover area 121 and a second wire changeover area 122. The first wire changeover area 121 and the second wire changeover area 122 are respectively connected to the first bending area 111 and the second bending area 112, and each of the first wire changeover area 121 and the second wire changeover area 122 includes at least two multiplexer (MUX) circuits connected in series. The two MUX circuits in series are MUX1 and MUX2.

Further, the bonding area 130 includes a touch bonding area 131 and a display bonding area 132. The touch bonding area 131 includes a plurality of touch bonding terminals 1311, and the display bonding area 132 includes a plurality of display bonding terminals 1321.

In some embodiments of the present application, two touch bonding areas are provided, namely a first touch bonding area 1301 and a second touch bonding area 1302. The first touch bonding area 1301 and the second touch bonding area 1302 are respectively connected to the first wire bonding area 121 and the second wire bonding area 122, and the first touch bonding area 1301 and the second touch bonding area 1302 each include a plurality of touch bonding terminals 1311. The touch leads of the touch lead layer 301 are connected to the touch terminal 1311. The display bonding terminal 1321 is connected to a display driver 140 provided on the non-light emitting area 102, and the other end of the display driver 140 is connected to the light-emitting area 101.

Further, as shown in FIG. 5, the first touch bonding area 1301 and the second touch bonding area 1302 are positioned at both sides of the non-light emitting area 102, and the display bonding area 132 is disposed on the middle of the non-light emitting area 102.

It should be noted that the MUX circuit can be one of a positive channel metal oxide semiconductor (PMOS) structure, a negative channel metal oxide semiconductor (NMOS) structure, or a complementary metal oxide semiconductor (CMOS) structure.

Figure 6:
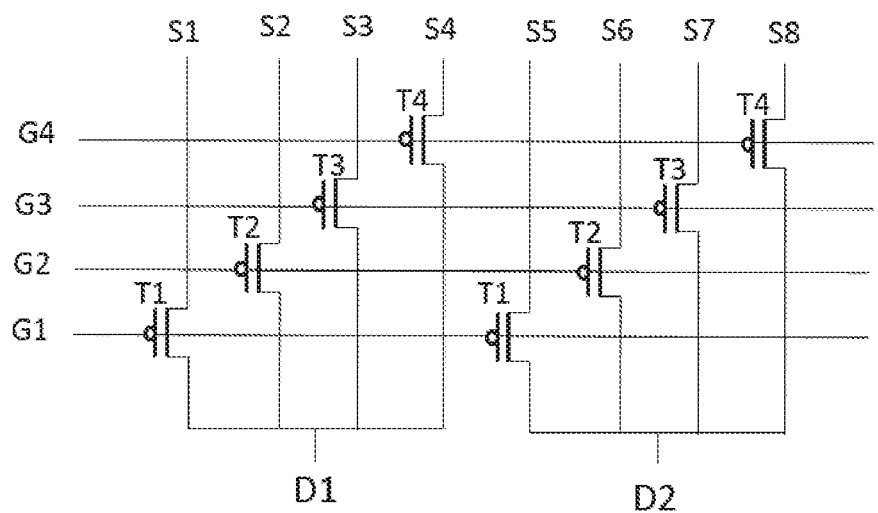
FIG. 6 is a schematic diagram of a multiplexer (MUX) circuit of a self-capacitive touch display panel according to an embodiment of the present invention.

Specifically, a 4:1 MUX circuit with a PMOS structure is taken as an example, as shown in FIG. 6. The MUX circuit includes two drains, four gates, eight sources, and eight PMOS structures. The two drains are D1 and D2, the four source gates are G1, G2, G3, and G4, the eight sources are S1, S2, S3, S4, S5, S6, S7, and S8, and the eight PMOS structures are T1, T2, T3, T4, T5, T6, T7, and T8. The principle is as follows: the gates G1, G2, G3, and G4 control a turning-on or a turning-off of the T1, T2, T3, and T4, respectively. Only one of the four T1, T2, T3, and T4 is selected to be turned on at the same period, and the remaining three are turned off. This can control the sequential driving and sensing of drain D1 to S1, S2, S3 and S4, and the sequential driving and sensing of drain D2 to S5, S6, S7, and S8 so that the number of channels of the touch leads can be reduced to ¼ of the original.

The MUX circuit can be one or a combination of a 2:1 MUX circuit, a 3:1 MUX circuit, a 4:1 MUX circuit, or a 5:1 MUX circuit. When a 4:1 MUX circuit is connected in series with a 3:1 MUX circuit, the number of channels can be reduced to 1/12 of the original, so that the number of on-cell self-capacitive touch bonding is greatly reduced, and sufficient space is reserved for the display bonding area 132, and the normal light emission of the display panel 100 is not affected while ensuring the touch function.

The self-capacitive flexible touch panel provided by the present invention has been described in detail above. It should be understood the exemplary embodiments described herein are considered descriptive, to help understand the core idea of the present invention, and not to limit the present invention. Descriptions of features or aspects in each exemplary embodiment should be considered as applicable to similar features or aspects in other exemplary embodiments. Although the present invention has been described with reference to exemplary embodiments, various changes and modifications may be suggested to one skilled in the art. Although the present invention has been described with reference to exemplary embodiments, various changes and modifications may be suggested to one skilled in the art.

What is claimed is:

1. A self-capacitive touch display panel, comprising a display panel and a touch layer disposed on the display panel;
   wherein the touch layer comprises:
   a touch lead layer disposed on an encapsulation layer of the display panel and comprising touch leads, a first insulating layer disposed on the touch lead layer, a touch shielding layer disposed on the first insulating layer; a second insulating layer disposed on the touch shielding layer, and a touch sensing layer disposed on the second insulating layer and comprising sensing patterns arranged in an array;
   wherein the touch shielding layer comprises a first touch shielding layer and a second touch shielding layer divided by the second insulating layer, and the second touch shielding layer is grounded;
   wherein each sensing pattern is in contact with the first touch shielding layer through a second via-hole penetrating the second insulating layer, and the first touch shielding layer is in contact with a respective touch lead through a first via-hole penetrating the first insulating layer;
   wherein the display panel comprises a light-emitting area and a non-light-emitting area, and the non-light-emitting area comprises a bending area, a wire changeover area, and a bonding area;
   wherein the touch leads are connected to the wire changeover area;
   wherein the wire changeover area is disposed on one side of the bending area away from the touch lead layer;
   wherein the touch leads are connected from the bending area to the bonding area via the wire changeover area; and
   wherein the bonding area is disposed on one side of the wire changeover area away from the bending area.

2. The self-capacitive touch display panel according to claim 1, wherein the first via-hole and the second via-hole are coaxial, and an opening width of the first via-hole is less than an opening width of the second via-hole.

3. The self-capacitive touch display panel according to claim 1, wherein the bonding area comprises a touch bonding area and a display bonding area, the touch bonding area comprises a plurality of touch bonding terminals, the display bonding area comprises a plurality of display bonding terminals, the touch leads of the touch lead layer are connected to a touch terminal, and the display bonding terminals are connected to a display driver disposed on the display panel.

4. The self-capacitive touch display panel according to claim 3, wherein the wire changeover area comprises a first wire changeover area and a second wire changeover area, and the first wire changeover area and the second wire changeover area each comprise at least two multiplexer (MUX) circuits connected in series.

5. The self-capacitive touch display panel according to claim 4, wherein the MLX circuits are one of a positive channel metal oxide semiconductor (PMOS) structure, a negative channel metal oxide semiconductor (NMOS) structure, or a complementary metal oxide semiconductor (CMOS) structure.

6. The self-capacitive touch display panel according to claim 1, wherein material of the first insulating layer and the second insulating layer is one of silicon nitride, silicon oxide, or a combination thereof.

7. The self-capacitive touch display panel according to claim 1, wherein material of the touch lead layer, the touch shielding layer, and the touch sensing layer is indium tin oxide, a combination of indium tin oxide and silver, or a combination of indium tin oxide and aluminum.

8. A self-capacitive touch display panel, comprising a display panel and a touch layer disposed on the display panel, wherein the touch layer comprises:
   a touch lead layer disposed on an encapsulation layer of the display panel and comprising touch leads, a first insulating layer disposed on the touch lead layer, a touch shielding layer disposed on the first insulating layer, a second insulating layer disposed on the touch shielding layer, and a touch sensing layer disposed on the second insulating layer and comprising sensing patterns arranged in an array;
   wherein the touch shielding layer comprises a first touch shielding layer and a second touch shielding layer divided by the second insulating layer, and the second touch shielding layer is grounded; and
   wherein each sensing pattern is in contact with the first touch shielding layer through a second via-hole penetrating the second insulating layer, and the first touch shielding layer is in contact with a respective touch lead through a first via-hole penetrating the first insulating layer.

9. The self-capacitive touch display panel according to claim 8, wherein the first via-hole and the second via-hole are coaxial, and an opening width of the first via-hole is less than an opening width of the second via-hole.

10. The self-capacitive touch display panel according to claim 8, wherein the display panel comprises a light-emitting area and a non-light-emitting area, and the non-light-emitting area comprises a bending area, a wire changeover area, and a bonding area;
   wherein the touch leads are connected to the wire changeover area;
   wherein the wire changeover area is disposed on one side of the bending area away from the touch lead layer;
   wherein the touch leads are connected from the bending area to the bonding area via the wire changeover area; and
   wherein the bonding area is disposed on one side of the wire changeover area away from the bending area.

11. The self-capacitive touch display panel according to claim 10, wherein the bonding area comprises a touch bonding area and a display bonding area, the touch bonding area comprises a plurality of touch bonding terminals, the display bonding area comprises a plurality of display bonding terminals, the touch leads of the touch lead layer are connected to a touch terminal, and the display bonding terminals are connected to a display driver disposed on the display panel.

12. The self-capacitive touch display panel according to claim 11, wherein the wire changeover area comprises a first wire changeover area and a second wire changeover area, and the first wire changeover area and the second wire changeover area each comprises at least two MUX circuits connected in series.

13. The self-capacitive touch display panel according to claim 12, wherein the MUX circuits are one of a PMOS structure, an NMOS structure, or a CMOS structure.

14. The self-capacitive touch display panel according to claim 8, wherein material of the first insulating layer and the second insulating layer is one of silicon nitride, silicon oxide, or a combination thereof.

15. The self-capacitive touch display panel according to claim 8, wherein material of the touch lead layer, the touch shielding layer, and the touch sensing layer is indium tin oxide, a combination of indium tin oxide and silver, or a combination of indium tin oxide and aluminum.

16. The self-capacitive touch display panel according to claim 8, wherein the self-capacitive touch display panel further comprises a touch protection insulating layer disposed above the touch layer, a polarizer disposed above the touch protection insulating layer, and a protective cover disposed above the polarizer.

\* \* \* \* \*